(12) United States Patent
Wittig et al.

(10) Patent No.: US 8,143,524 B2
(45) Date of Patent: Mar. 27, 2012

(54) INDUSTRIAL ADHESIVE TAPE AND ITS USE

(75) Inventors: Gülay Wittig, Bochum (DE); Christoph Lodde, Holzwickede (DE)

(73) Assignee: Coroplast Fritz Muller GmbH & Co. KG, Wuppertal (DE)

( * ) Notice: Subject to any disclaimer, the term of this patent is extended or adjusted under 35 U.S.C. 154(b) by 2026 days.

(21) Appl. No.: 12/806,207

(22) Filed: Jun. 13, 2005

(65) Prior Publication Data

US 2011/0226529 A1    Sep. 22, 2011

(30) Foreign Application Priority Data

Jun. 15, 2004    (DE) .......................... 10 2004 028 825

(51) Int. Cl.
*H01B 7/08*    (2006.01)

(52) U.S. Cl. .............. 174/117 A; 428/343; 428/355 AC; 428/354; 442/149; 442/151

(58) Field of Classification Search ................. 174/68.1, 174/70 R, 71 R, 110 R, 117 A, 117 M, 119 R, 174/119 C, 120 R, 121 R; 428/343, 354, 428/355 AC; 442/149, 151
See application file for complete search history.

(56) References Cited

FOREIGN PATENT DOCUMENTS

| EP | 0995782 | 4/2000 |
|---|---|---|
| WO | WO 03033611 | 4/2003 |

*Primary Examiner* — Arti Singh-Pandey
(74) *Attorney, Agent, or Firm* — Brinks Hofer Gilson & Lione

(57) ABSTRACT

The invention relates to an industrial adhesive tape. The tape includes a tape-shaped textile dyed backing and an adhesive coating, in particular a pressure sensitive adhesive coating applied to at least one side of the textile dyed backing. To achieve significantly reduced inherent discoloration or decolorization and also reduced discoloration of the wrapped materials, and hence improved compatibility of the adhesive tape with the materials to be adhered together, such as cablesets, the textile backing is fabricated from spun-dyed threads or fibers.

16 Claims, 2 Drawing Sheets

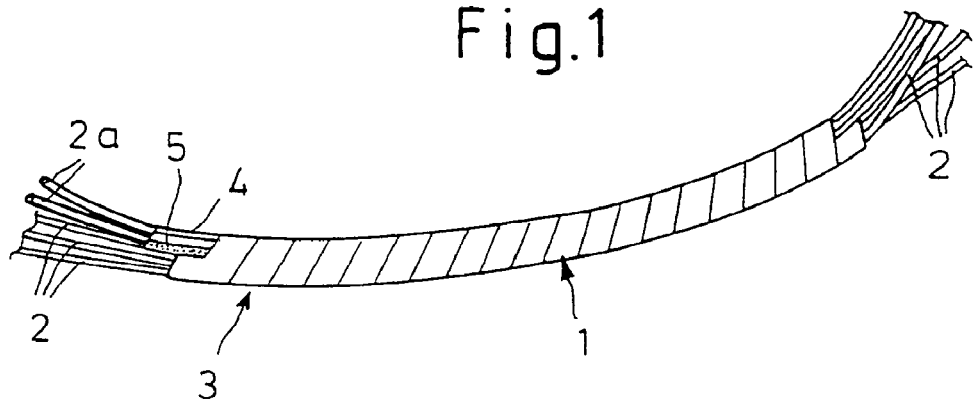
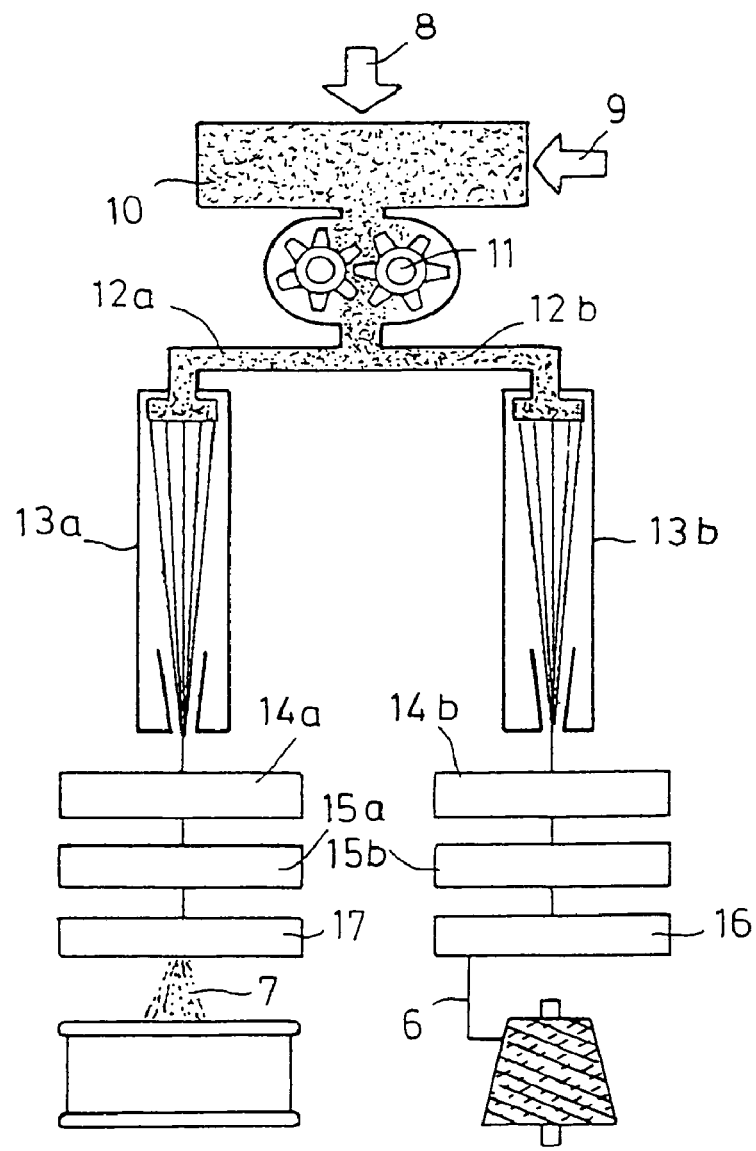

__US 8,143,524 B2__

INDUSTRIAL ADHESIVE TAPE AND ITS USE

CROSS-REFERENCE TO RELATED APPLICATION

This application claims priority to German Patent Application No. 10 2004 028 825.9, filed Jun. 15, 2004.

BACKGROUND

1. Field of the Invention

This invention relates to an industrial adhesive tape comprising a tape-shaped textile dyed backing and a single- or both-sidedly applied adhesive, in particular pressure sensitive adhesive, coating.

2. Related Technology

Industrial adhesive tapes useful in the cable-wrapping sector in particular currently overwhelmingly utilize backing materials composed of viscose rayon staple wovens, polyester wovens or nonwovens.

Viscose rayon staple woven adhesive tapes have the disadvantage of being rottable and of a limited thermal stability up to about 100° C. The backing material is typically dyed, in particular black, with disperse dyes. Aging at elevated temperatures leads for these known tapes disadvantageously not only to a reduction in color quality but also in particular to a decomposition of the backing material, and can impair the compatibility of the tape with leads to be wrapped.

Polyester, in particular PET, woven adhesive tapes are unrottable and have a significantly higher breaking strength and a higher thermal stability than viscose rayon staple woven adhesive tapes. To obtain the black color desired in most cases for use as a cable-wrapping tape in the automotive industry, the wovens are dyed with disperse dyes. At temperature levels above 125° C., the disperse dye or its components are observed to migrate from the fabric, and this leads to a color change on the part of the fabric and in certain circumstances also on the part of the wrapped leads. The migrated entities may even, depending on the chemical identity of the insulating material used, impair the technical properties of the lead, such as breaking extension or thermal stability.

Nonwovens which, as will be known, are likewise used as a backing material for industrial adhesive tapes, in particular cable-wrapping tapes, likewise consist overwhelmingly of polyester. There are spunbonded nonwovens produced from continuous filaments and there are nonwovens produced from staple fibers of defined length. Nonwovens can be consolidated using different methods, such as stitching, needling, embossing or by means of a water jet. Nonwoven fabrics are likewise dyed with disperse dyes. At temperature levels above 125° C. the disperse dye is again observed to migrate out of the disperse-dyed materials, and this can potentially have the same adverse consequences for compatibility with the wrapped lead as described above for wovens.

Disperse dyeing, whether performed continuously (for example by thermosoling using an integrated pad-mangle) or batchwise (on a so-called beam or by using a "high pressure jigger"), white fabric is exposed to a dye in a bath. Dispersants are utilized as auxiliaries in order that uniform distribution of the dyes in the dispersion may be obtained. The dye in this dyeing process initially deposits around the fiber to then penetrate into it under the influence of heat and/or pressure. To prepare for the actual dyeing operation, the fabric can be desized or deoiled and/or pre-set in order that dye penetration may be facilitated. In the continuous thermosol process, the dyeing is subsequently heat-set.

Small dye molecules are utilized in rapid dyeing, while comparatively larger dye molecules are utilized in normal dyeing. Rapid dyeing, in addition to dye molecules, may employ dyeing accelerants known as carriers, such as benzenes, phenylphenols or dicarboxylic esters, which have an additional, fabric-plastizing effect. The above-described disadvantages of disperse-dyed backing materials, namely that they may decolorize at high temperatures and low molecular weight constituents may migrate out of the woven or nonwoven fabric, occur because of the high level of molecular mobility preferentially in the case of rapid dyeing, but also, depending on the temperature load, in the case of normal dyeing. Since carriers may also reduce color fastness, they are in many cases omitted and dyeing times lengthened.

About 20 to 25 percent of the dye used does not penetrate into the fabric and is present as excess dye, which then has to be removed again by a chemical aftertreatment, for example by reduction clearing with aqueous sodium hydroxide solution and hydrosulfite.

Especially cables to be used in automotive construction, including the adhesive tapes used for cable wrapping, have to meet a demanding performance profile. To verify that a material of construction meets existing performance requirements, various examinations and tests are prescribed. Examples to be mentioned here are the VW standard 60306, the test prescribed by Mercedes Benz AG for wrapping tapes for cableset production or the draft standards LV 112 (issued July 2003) or LV 312 (issued April 2004) agreed by various automotive manufacturers.

According to these standards, the material of construction used for insulating the leads shall meet the requirements of VDA 231-106. The minimum and maximum sustained use temperatures ($T_U$ and $T_O$) for a use period of 3000 h are −40° C. and 100° C. (105° C. in the case of PVC insulation material) for a classification into temperature class B for example, and the material shall be capable of withstanding a short-temperature (240 hours) of 125±3° C. and an overload temperature (6 hours) of 150±3° C.

Aging performance is rated according to whether it is for a short term (240 h) or a long term (3000 h). Requirements and experimental conditions for both the tests are given by DIN ISO 6722-1 and -2. A wrapping test is performed at 25° C. after the short term aging and at room temperature after long term aging. A wrapping test is additionally carried out at low temperature (−40° C.), again according to DIN ISO 6722-1 and -2.

With regard to the compatibility of leads with other cableset components, such as the cable-wrapping tapes, here LV 112 provides, inter alia, for a test of media resistance against a Coroplast 837X adhesive tape of the aforementioned kind.

As very recent experience has shown, adhesive tapes can cause such pronounced discoloration of individual cables that the original color of an individual cable is no longer discernible. It is likely that the relevant testing methods will have to be supplemented with regard to discoloration, so that significant discoloration is no longer permissible in the future. When leads exhibit pronounced discoloration, there is a risk that in the event of service it is no longer possible to decide which lead in a cable harness performs which function.

The known backing materials described at the beginning are typically coated with an adhesive coating of hotmelt adhesives based on natural or synthetic rubber. Such adhesive tapes are used for sustained use at temperatures of not more than 100° C. (viscose rayon staple tapes) to 125° C. (polyester tapes), which corresponds to temperature classes A to C as defined by LV 112. Acrylate-based hotmelt adhesives have also come to be used of late. These adhesives possess better aging resistance than rubber adhesives and therefore, if combined with suitable backings, permit use of the tapes for the 150° C. temperature class (temperature class D). With regard to the compatibility or otherwise of the adhesives with the backing material and of the adhesive tapes with the electric leads, it has to be assumed that the adhesives used lead to interactions with the dyes used in the backing material or its components and to an influence on the migration of these components through the layer of adhesive into the core insulation of the leads.

Owing to their high degree of flexibility, their excellent noise-muffling properties and their favorable properties with regard to high abrasion resistance, it is desirable that adhesive tapes comprising textile backings also be used for high thermal load applications in lieu of film adhesive tapes or convoluted tubes. For these high thermal loads, however, the above-described dye migration constitutes a problem, in particular with regard to woven PET fabric.

SUMMARY

The present invention has for its object to provide such an industrial adhesive tape of the kind mentioned at the beginning as exhibits at elevated thermal loads, in particular in temperature classes A to D of the works standard mentioned, a significantly reduced intrinsic discoloration or decolorization and also discolorization of the wrapped materials and hence improved compatibility with the materials to be adhered, in particular cablesets.

This object is achieved according to the present invention when the textile backing consists of spun-dyed threads or fibers.

In spin dyeing, a polymer used for producing fibers is initially melted. To produce a spinning dope, additives such as antioxidants and color pigments are added to the polymer melt. The spinning dope which is used for producing the fibers is directly colored in a manner which is comparatively less costly, less inconvenient and technologically more gentle to the environment. The dope is subsequently spun by means of an extruder and further processed to form yarns or staple fibers. Thus, by proceeding according to the invention and using spun-dyed yarns or fibers as a backing material for the adhesive tape, the dye is advantageously already incorporated in the polymeric matrix in the course of the operation of producing the fibers themselves, in such a way that there can be no decolorization of the textile material or any dye migration later in the course of storage or exposure of the adhesive tape at elevated temperatures.

It is a further advantage of the invention that there are no colored constituents of the kind which are generally subsumed under the term "low molecular weight" in the case of disperse dyeing and are able to reduce the compatibility of the present invention's adhesive tape with the lead material, since the mobility of all colored constituents is inhibited by incorporation in the polymeric matrix.

The advantageousness of the invention is particularly plain when the backing consists at least partly of a polyester, such as PET, or of a polyamide, such as N66. It is also possible here for the backing to consist of a plurality of yarns of synthetic fibers or of a blend fiber yarn consisting of PET/PA in particular.

The yarns may be present in flat or textured form as filament yarns or as staple fiber yarns. The basis weight of the backing is preferably in the range from 20 to 200 g/m² and more preferably in the range from 40 to 120 g/m², and is ideally combined with a 20 to 150 g/m² add-on for the pressure sensitive adhesive.

A commercially available adhesive based on synthetic rubbers can be used in a conventional manner as pressure sensitive adhesive. But, surprisingly, the pressure sensitive adhesive may also consist of one or more acrylates crosslinkable through the action of UV or electron beam radiation in particular, in which case no unfavorable influence of the radiation on the backing dye was observed, whether from the sole use of customary electron sources or pure mercury medium pressure lamps as sources of irradiation or when some or all of the UV lamps used consisted additionally or alternatively of preferably iron-, lead- or gallium-doped radiators.

The adhesive tape of the present invention is very useful for winding cablesets, since it meets not just the LV 112/LV 312's and the corresponding works standards' requirements with regard to temperature classes A and B but also with regard to temperature classes C and D, and possesses high long-term compatibility with most core-insulating materials. High compatibility with the leads will be apparent in particular when the cableset utilizes leads sheathed with PVC, XPE, PP, FEP or ETFE.

Further advantageous design features of the invention are contained in the subclaims and also the description which follows.

BRIEF DESCRIPTION OF THE DRAWINGS

The invention will now be more particularly described with reference to two operative examples depicted in the accompanying drawing, where FIG. 1 shows a representation of a cable harness wrapped with an industrial adhesive tape according to the present invention, FIG. 2 shows a technological scheme of producing fibers for the backing of an industrial adhesive tape according to the present invention.

DETAILED DESCRIPTION OF THE INVENTION

Figure 3:
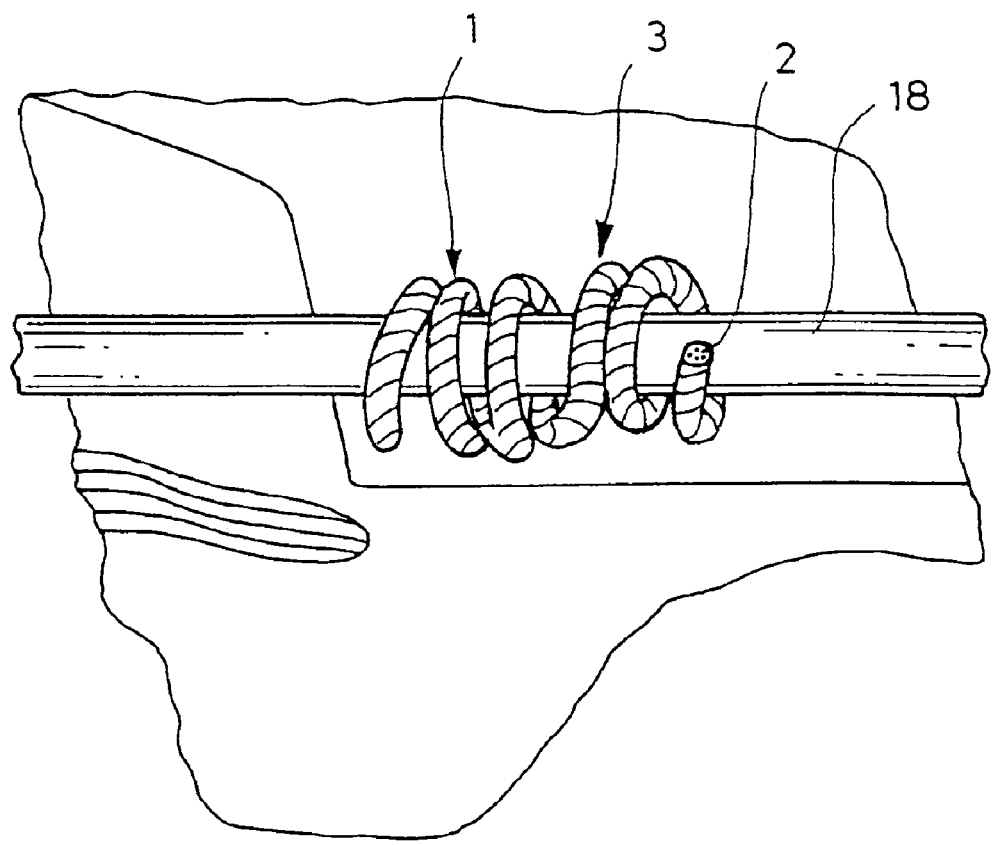
FIG. 3 shows a representation to illustrate the testing procedure to which the exemplified industrial adhesive tapes according to the present invention were subjected.

The various figures of the drawing always identify like parts with like reference numerals, so that they are generally described only once each.

As initially illustrated by FIG. 1, which shows a preferred use of an inventive adhesive tape 1 for wrapping cablesets, an adhesive tape according to the present invention is advantageously useful for sheathing cores 2 of electric leads, whereby it is possible to produce a cable harness 3, in particular for the automotive industry.

The present invention's adhesive tape 1 comprises a tape-shaped textile dyed backing 4 and, single-sidedly applied to the backing 4, an adhesive coating 5 consisting of a pressure sensitive adhesive. According to the present invention, the textile backing 4 consists of spun-dyed threads 6 or fibers 7.

The production of these threads 6 or fibers 7 is schematically illustrated by FIG. 2. FIG. 2 shows in detail that initially a polymeric raw material 8 is admixed with color pigments 9 and melted to form a spinning dope 10, which may include antioxidants and/or processing aids as additives as well as the color pigments 9, which, to produce a black coloration, can be materials based on aciniform carbon in particular. The spinning dope 10, which is used for producing the threads 6 and fibers 7, is thus directly colored. The spinning dope 10 in the depicted embodiment is pumped by a gear pump 11 via two feed strands 12a, 12b to respective spinning positions 13a, 13b which are each followed by the process steps of stretching and crimping, which are symbolized by the boxes bearing reference numerals 14a, 14b and 15a, 15b in the drawing. Crimping 15a, 15b is then followed by a process step of winding 16 to produce the threads 6, whereas a cutting step 17 is envisioned to produce the fibers 7. The thus produced dyed threads 6 or fibers 7 served to produce the backing 4 for the present invention's adhesive tape 1.

Example 1

A spun-dyed black woven PET fabric serving as backing 4 for the present invention's adhesive tape was coated with an acrylate adhesive. This acrylate adhesive was crosslinked by UV radiation and thus formed a pressure sensitive adhesive coating 5 on the backing 4. The coated fabric was then self-wound and subsequently end-itemed into adhesive tape rolls. The thus produced adhesive tape 1 was used to wrap a lead set consisting of a plurality of cores 2 which had a PVC sheath which bears reference numeral 2a in FIG. 1. The resultant cable harness 3 was wrapped around a mandrel 18 as FIG. 3 shows and subjected to an aging test at a temperature of 125° C. for 10 days (240 h).

For comparison, a known, disperse-dyed woven PET fabric adhesive tape was also subjected to aging under the same conditions.

Visual examination after the aging test revealed that the adhesive tape of the present invention was the same black. Neither the adhesive coating 5 nor the lead insulation 2a of the cores 2 showed any color change.

The adhesive tape with the conventional, disperse-dyed woven PET backing, which was produced and processed under the same conditions, showed a slight post-aging discoloration not only of the adhesive coating but also of the lead insulation.

Example 2

A black spun-dyed backing 4 of woven PET fabric was coated with an acrylate adhesive to form an adhesive coating 5. The adhesive was crosslinked using UV radiation. The coated fabric was then self-wound and subsequently end-itemed into adhesive tape rolls. The thus produced adhesive tape 1 was used to wrap a ETFE lead set consisting of a plurality of cores 2 to form a cable harness 3 which was aged at 175° C. for 10 days. While the backing 4 of the inventive, spun-dyed adhesive tape 1 was the same black after this accelerated aging test, with neither the adhesive coating 5 nor the lead insulation 2a showing any color change, an adhesive tape produced and processed similarly except that a conventional, disperse-dyed woven PET backing was used, had become completely decolorized under these conditions. As with the first operative example, the sheath 2a was free of any cracks, breaks or other function-relevant damage when the present invention's adhesive tape 1 was used. Besides, the insulation fulfilled the above-described requirements of LV 112.

The invention is not restricted to the operative examples described, but also encompasses all embodiments having an identical effect within the meaning of the invention. Thus, an adhesive tape 1 where the backing 4 has a double-sided coating likewise falls within the realm of the invention. It is also possible to produce the backing 4 from a spun-dyed spun-bonded or a staple fiber nonwoven, in which case the nonwoven may be consolidated by stitching, needling or hydroentangling in particular.

Nor is the invention restricted to the combinations of features defined in the claims, but can also be defined by any desired other combination of certain features of all individual features disclosed in total. This means that, in principle, virtually every individual feature of the independent claims can be omitted or replaced by at least one individual feature disclosed elsewhere herein. To this extent, the identified claims are merely to be understood as a first wording attempt for an invention.

REFERENCE NUMERALS 1 adhesive tape
2 core
2a sheath of 2
3 cable harness
4 backing of 1 for 5
5 adhesive coating of 1 on 4
6 thread of 4
7 fibers of 4
8 raw material for 6, 7
9 color pigments for 6, 7
10 spinning dope from 8, 9
11 pump
12a, 12b feed strands for 10
13a, 13b process step, spinning of 10
14a, 14b process step, stretching
15a, 15b process step, crimping
16 process step, winding
17 process step, cutting
18 mandrel

What is claimed is:

1. A cable harness assembly comprising a cableset and an adhesive tape wrapped around the cableset, the cableset including a plurality of cables, each of the cables having a core and a sheath located about the core, the adhesive tape including a tape-shaped textile dyed backing constructed of spun-dyed threads or fibers and an adhesive coating applied to at least one side of textile dyed backing.

2. The cable harness assembly of claim 1 wherein the sheaths are formed from one selected from the group of PVC, XPE, PP, FEP or ETFE.

3. The cable harness assembly of claim 1 wherein the adhesive coating is a pressure sensitive adhesive.

4. The cable harness assembly of claim 1 wherein after 240 hours of aging at a temperature of at least 125° C. the adhesive tape and the sheaths of the cables are free of any discoloration.

5. The cable harness assembly of claim 1 wherein the cable harness meets the requirements for one of temperature classes A to D as defined in the standards LV 112, LV 312 or corresponding OEM works standards.

6. The cable harness assembly of claim 1 wherein the cable harness meets the requirements for compatibility of the adhesive tape and cables of the cable harness assembly with regard to media resistance as defined in the LV 112 works standard.

7. The adhesive tape according to claim 1 wherein said backing comprises one or more yarns of synthetic fibers.

8. The adhesive tape according to claim 1 wherein said backing is formed at least partly of a polyester.

9. The adhesive tape according to claim 1 wherein said backing consists at least partly of a polyamide.

10. The adhesive tape according to claim 1 wherein said backing is formed of a blend fiber yarn consisting of PET/PA.

11. The adhesive tape according to claim 1 wherein said backing is formed of filament yarns.

12. The adhesive tape according to claim 1 wherein said backing is formed of textured yarns.

13. The adhesive tape according to claim 1 wherein said backing has a basis weight in the range of 20-200 $g/m^2$ and preferably 40-120 $g/m^2$.

14. The adhesive tape according to claim 1 wherein the adhesive coating is a pressure sensitive adhesive consisting of one or more acrylates crosslinkable through the action of UV or electron beam radiation.

15. The adhesive tape according to claim 1 wherein the adhesive coating is a pressure sensitive adhesive based on a synthetic rubber.

16. The adhesive tape according to claim 1 wherein the adhesive coating is a pressure sensitive adhesive having an add-on of 20-150 $g/m^2$.

* * * * *